[72] Inventor Renville H. McMann, Jr.
New Canaan, Conn.

[21] Appl. No. 720,901
[22] Filed Apr. 12, 1968
[45] Patented Feb. 9, 1971
[73] Assignee Columbia Broadcasting Systems, Inc.
New York, N.Y.
a corporation of New York

[54] RECORDING APPARATUS UTILIZING PLANE OF POLARIZATION MODULATOR
10 Claims, 30 Drawing Figs.

[52] U.S. Cl. .......... 178/6.7, 179/100.3; 250/199
[51] Int. Cl. .......... H04n 5/84, G11b 7/02; H04b 9/00
[50] Field of Search .......... 178/6.7, 6.7A, 6.6B; 250/199; 179/100.3A, B, D, Z, 100.2S, (MF), K; 332/(Inquired)

[56] References Cited

UNITED STATES PATENTS

| | | | |
|---|---|---|---|
| 3,141,926 | 7/1964 | Newell | 178/5.4 |
| 3,154,371 | 10/1964 | Johnson | 346/108 |
| 3,314,075 | 4/1967 | Becker | 346/108 |
| 3,316,348 | 4/1967 | Hufnagel | 178/6.7 |
| 3,448,458 | 6/1969 | Carlson et al. | 178/6.7X |
| 3,457,414 | 7/1969 | Ragen et al. | 250/199 |

OTHER REFERENCES

McDonnell, OPTICAL SWEEP AND RECORDING SYSTEM, IBM Technical Disclosure Bulletin, Vol. 9, No. 8 Jan. 67, p. 1002

Takasaki et al., AN AUTOMATIC RETARDATION METER FOR AUTOMATIC POLARIMETRY BY MEANS OF AN ADP POLARIZATION MODULATOR, APPLIED OPTICS, vol. 3, No. 3, Mar. 64, pp. 345— 350

*Primary Examiner*—Bernard Konick
*Assistant Examiner*—Raymond F. Cardillo, Jr.
*Attorney*—Brumbaugh, Free, Graves & Donohue

ABSTRACT: A laser produces a beam of coherent light which is polarized and transmitted through a light modulator that adjusts the orientation of the plane of polarization of the transmitted light in response to a video signal. The light transmitted by the light modulator then impinges on an analyzer. In one embodiment, the analyzer is adjusted to produce maximum extinction ratio by a motor responsive to the output of a phase detector. The inputs to the phase detector are a reference signal and a signal derived from a reference component of the video signal. The reference component of the video signal is in turn derived in part from the reference signal.

In another embodiment, the output of the phase detector controls the video gain so that the white level is properly adjusted.

INVENTOR.
RENVILLE H. McMANN, JR.
BY Brumbaugh, Free, Graves & Donohue
his ATTORNEYS FIG. 3 Output of line drive ÷ 2

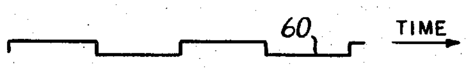

FIG. 4 Blanking used as gating signal to gates 46 & 56

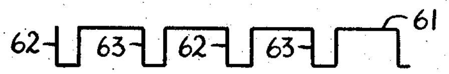

FIG. 5 Output of gate 56

FIG. 6 Output of inverter 58

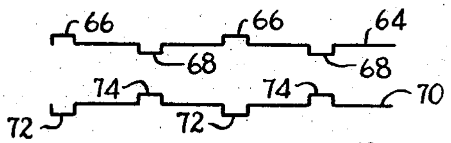

FIG. 7 Conventional video signal

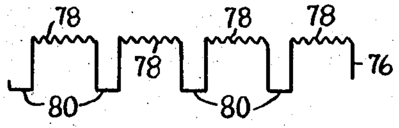

FIG. 8 Video signal modified by output of inverter 58

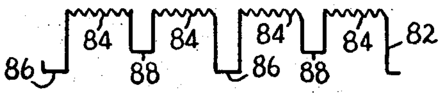

FIG. 9 Output of gate 46 for correct black bias

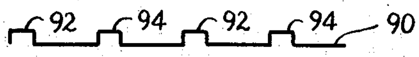

FIG. 10

FIG. 11 Output of gate 46 for excessive black bias

FIG. 12

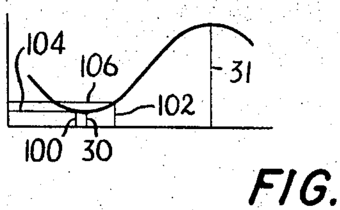

FIG. 13

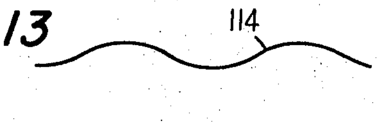

FIG. 14

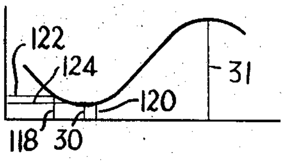

FIG. 15 Output of gate 46 for insufficient black bias

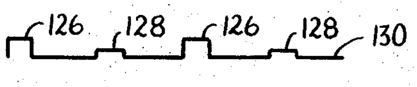

FIG. 16

FIG. 17

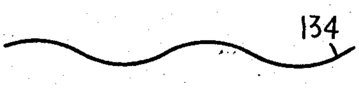

FIG. 18 Video correction signal if needed

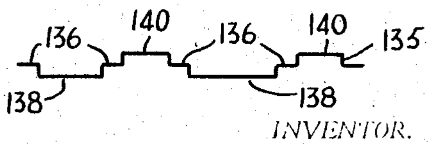

INVENTOR.
RENVILLE H. McMANN, JR.
BY
Brumbaugh, Free, Graves & Donohue
his ATTORNEYS FIG. 20
Output of white pulse generator 150

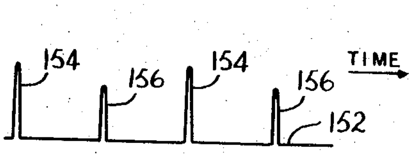

FIG. 21
Video signal modified by output of white pulse generator 150

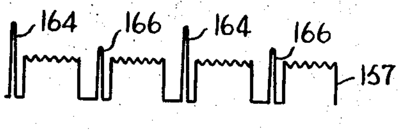

FIG. 22

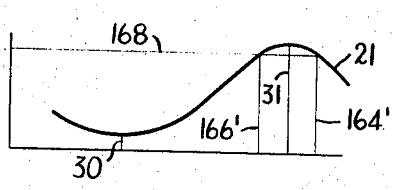

FIG. 23
Output of gate 168 for correct video amplifier gain

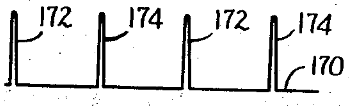

FIG. 24
Modified output of gate 168 for correct video amplifier gain

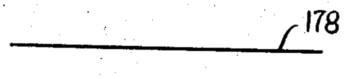

FIG. 25
Output of gate 168 for excessive video amplifier gain

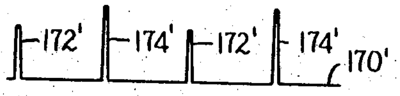

FIG. 26

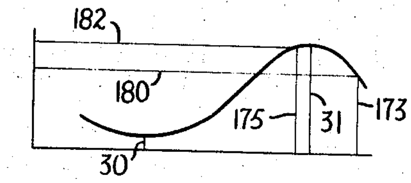

FIG. 27
Modified output of gate 168 for excessive video amplifier gain

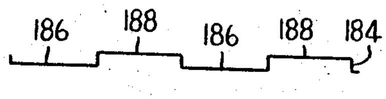

FIG. 28
Output of gate 168 for insufficient video amplifier gain

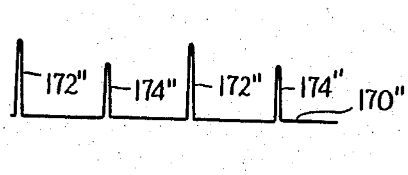

FIG. 29

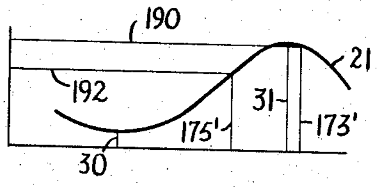

FIG. 30
Modified output of gate 168 for insufficient video amplifier gain

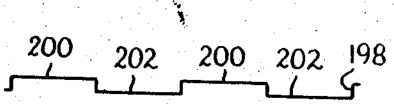

INVENTOR.
RENVILLE H. McMANN, JR.
BY
Brumbaugh, Free, Graves & Donohue
his ATTORNEYS

RECORDING APPARATUS UTILIZING PLANE OF POLARIZATION MODULATOR

BACKGROUND OF THE INVENTION

This invention relates to modulators and, more particularly, to novel and highly-effective means for controlling a modulator of electromagnetic radiation.

It is conventional to employ means for modulating coherent electromagnetic radiation in, for example, the television industry. In conventional apparatus, a beam of coherent light from a laser is passed through a polarizer to polarize the light in a first plane. The polarized light is passed through a light modulator which changes the orientation of the plane of polarization of the transmitted light in response to a video signal impressed on the light modulator. The light transmitted by the light modulator impinges on an analyzer and is transmitted by the analyzer to an extent which is a function of the angle formed by the polarizing plane of the analyzer and the plane of polarization of the polarized light impinging on the analyzer.

Ideally, for a "block" signal, the plane of polarization of the polarized light impinging on the analyzer forms an angle of 90° with the polarizing plane of the analyzer; for a "white" signal, the angle between the two planes is zero. Thus, the black signal results in zero or minimum transmission of light by the analyzer, and the white signal results in maximum transmission of light by the analyzer.

In conventional apparatus, however, ideal operating conditions are not maintained over an extended period of time. Changes in temperature, humidity, and other operating conditions result in a drift in the characteristics of the optical modulator. Principally for this reason, and also to some extent for the reason that there may occur a line-to-line offset in the clamp level applied to the light modulator, the blanking signal, although initially actuating the light modulator to rotate the plane of the polarized light passing therethrough so that the light incident upon the analyzer is polarized at 90° to the polarizing plane of the analyzer, eventually actuates the light modulator in such a manner as to rotate the plane of the polarized light passing therethrough either too much or too little. In either case, the plane of polarization of the light incident upon the analyzer forms an angle other than 90° with the polarizing plane of the analyzer, so that some light is transmitted by the analyzer.

Similarly, if the rotation of the plane of polarization effected by the light modulator in the case of a white signal is initially such that the plane of polarization of light incident upon the analyzer is coincident with the polarizing plane of the analyzer, nevertheless, in time, because of changing conditions of the apparatus, the two planes form an angle with respect to each other, so that maximum transmission does not occur in response to a white signal.

These shortcomings of conventional apparatus necessitate frequent manual adjustment of the apparatus.

SUMMARY OF THE INVENTION

An object of the present invention is to remedy the shortcomings of conventional apparatus pointed out above. In particular, an object of the invention is to provide apparatus adapted to produce maximum extinction ratio and to maintain this extinction ratio continuously and automatically. Another object of the invention is to provide apparatus adapted to control the gain of the modulating signal so that white level is continuously and automatically optimized.

These and other objects of the invention are attained by the provision of a signal-carrier generator for producing a signal carrier, reference-signal means for producing a reference signal, modulation means responsive in part to the reference-signal means for impressing a modulation signal derived in part from the reference signal on the signal carrier and producing a modulated output including a reference component related to the reference signal, and monitoring means for monitoring the reference component and producing a monitor output corresponding thereto. In accordance with the invention, phase detector and control means is also provided for making a phase comparison between the monitor output and the reference signal and controlling the modulation means in accordance therewith so that the reference component conforms to a predetermined standard.

BRIEF DESCRIPTION OF THE DRAWING

An understanding of additional aspects of the invention may be gained from a consideration of the following detailed description of two representative embodiments thereof, taken in conjunction with the accompanying FIGS. of the drawing, in which:

FIG. 3 is a graph of a reference signal generated in accordance with the invention;

FIG. 4 is a graph of blanking pulses employed as a gating signal in accordance with a first embodiment of the invention;

FIG. 5 is a graph of a gated output generated in accordance with a first embodiment of the invention;

FIG. 6 is a graph of a gated output generated and inverted in accordance with a first embodiment of the invention;

FIG. 7 is a graph of a conventional video signal;

FIG. 8 is a graph of a video signal modified in accordance with a first embodiment of the invention;

FIG. 9 is a graph of a gated output generated in accordance with a first embodiment of the invention for correct adjustment of the apparatus of the invention;

FIG. 10 is a graph of a waveform equivalent to that shown in FIG. 9 showing absence of periodicity of the waveform of FIG. 9 at a frequency equal to one-half the frequency of recurrence of the gated output shown in FIG. 9;

FIG. 11 is a graph of a gated output corresponding to that shown in FIG. 9 but illustrating a first incorrect adjustment of the apparatus of the invention;

FIG. 12 is a graph similar to that of FIG. 1 but showing an incorrect adjustment corresponding to that shown in FIG. 11;

FIG. 13 is a graph of a waveform equivalent to that shown in FIG. 11 showing a periodicity of the waveform of FIG. 11 at a frequency equal to one-half the frequency of recurrence of the gated output shown in FIG. 11;

FIG. 14 is a graph similar to FIG. 1 but showing an incorrect adjustment corresponding to that shown in FIG. 15;

FIG. 15 is a graph of a gated output corresponding to that shown in FIG. 11 but illustrating a second incorrect adjustment of the apparatus of the invention;

FIG. 16 is a graph of a waveform equivalent to that shown in FIG. 15 showing a periodicity of the waveform of FIG. 15 at a frequency equal to one-half the frequency of recurrence of the gated output shown in FIG. 15, the waveform of FIG. 16 being out of phase with that of FIG. 13;

FIG. 17 is a graph of a waveform equivalent to that of FIG. 3 and suitable for phase comparison with the waveform of FIG. 10, 13, or 16;

FIG 18 is a graph of a video correction signal generated in accordance with a first embodiment of the invention;

FIG. 20 is a graph of a white level signal generated in accordance with the invention;

FIG. 21 is a graph of a video signal modified in accordance with a second embodiment of the invention;

FIG. 22 is a graph similar to FIG. 1 showing a correct adjustment corresponding to that shown in FIG. 23;

FIG. 23 is a graph of a gated output generated in accordance with a second embodiment of the invention for correct adjustment of the apparatus of the invention;

FIG. 24 is a graph of a waveform equivalent to that shown in FIG. 23 showing absence of periodicity of the waveform of FIG. 23 at a frequency equal to one-half the frequency of recurrence of the gated output shown in FIG. 23;

FIG. 25 is a graph of a gated output corresponding to that shown in FIG. 23 but illustrating a first incorrect adjustment of the apparatus of the second embodiment of the invention;

FIG. 26 is a graph similar to that of FIG. 1 but showing an incorrect adjustment corresponding to that shown in FIG. 25;

FIG. 27 is a graph of a waveform equivalent to that shown in FIG. 25 showing a periodicity of the waveform of FIG. 25 at a frequency equal to one-half the frequency of recurrence of the gated output shown in FIG. 25;

FIG. 28 is a graph of a gated output corresponding to that shown in FIG. 25 but illustrating a second incorrect adjustment of the apparatus of the second embodiment of the invention;

FIG. 29 is a graph similar to that of FIG. 1 but showing an incorrect adjustment corresponding to that shown in FIG. 28; and FIG. 30 is a graph of a waveform equivalent to that shown in FIG. 28 showing a periodicity at a frequency equal to one-half the frequency of recurrence of the gated output shown in FIG. 28, the waveform of FIG. 30 being out of phase with that of FIG. 27.

DESCRIPTION OF THE PREFERRED EMBODIMENTS

Figure 1:
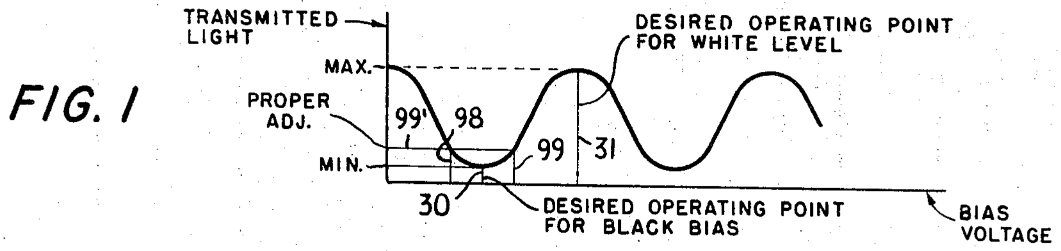
FIG. 1 is a graph of the light output of a typical polarizer, light modulator, and analyzer as a function of bias voltage applied to the light modulator, and indicating the desired operating range of the bias voltage.

Light modulators of the polarizing or interference type typically have curves such as that shown in FIG. 1. FIG. 1 is a graph of transmitted light as a function of bias voltage and shows that the transmitted light is a sinusoidal function of bias voltage. As bias voltage increases, the light output of the polarizer, light modulator and analyzer combination ranges between maxima and minima. A signal level corresponding to black should result in minimum transmission of light, and a signal level corresponding to white should result in maximum transmission of light. Thus, a typical operating range in, for example, a laser color kinescope recorder is between a voltage represented by a line 30 at which minimum transmission occurs and a voltage represented by a line 31 at which maximum transmission occurs. In conventional apparatus, these operating points drift because of changes in operating conditions such as temperature.

Figure 2:
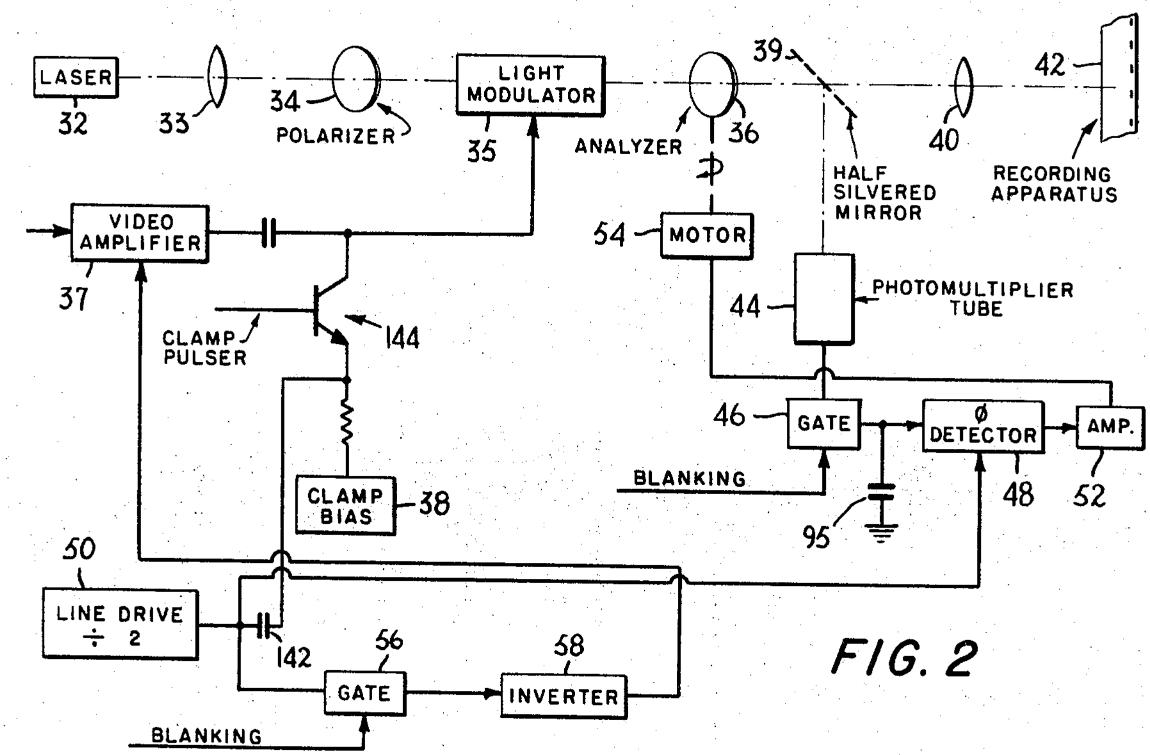
FIG. 2 is a schematic view of a first representative embodiment of apparatus constructed in accordance with the invention.
Figure 19:
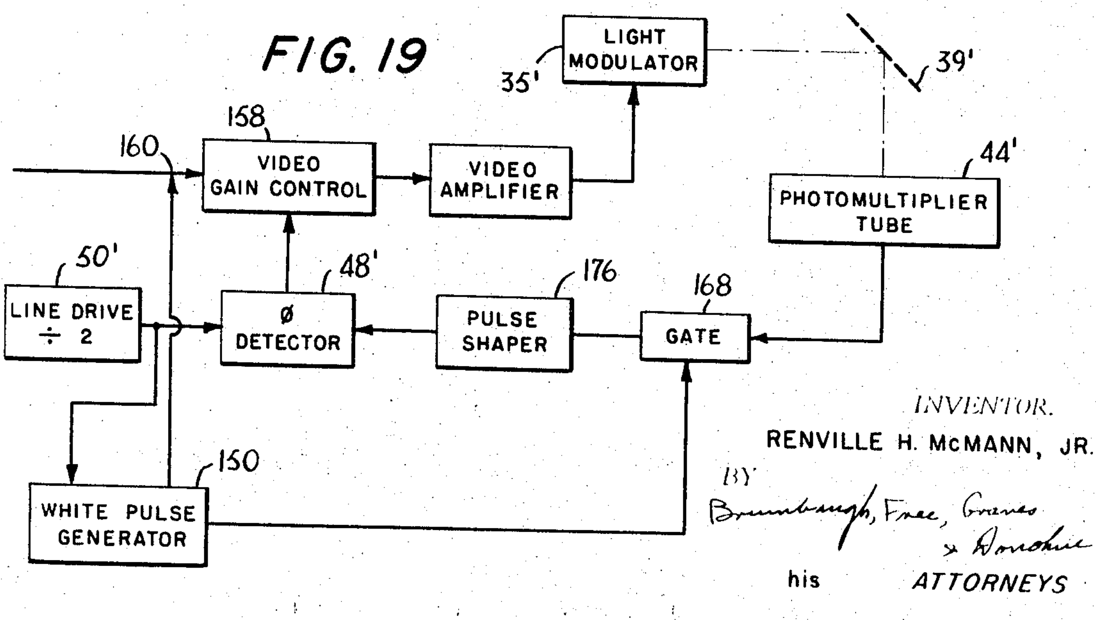
FIG. 19 is a schematic view of a second representative embodiment of apparatus constructed in accordance with the invention.

The apparatus of FIG. 2 is adapted to maintain the operating point 30 at the desired level, and the apparatus of FIG. 19 is adapted to maintain the operating point 31 at the desired level.

In the apparatus of FIG. 2, a signal carrier generator such as a laser 32 generates a signal carrier such as a beam of coherent light which passes through appropriate optics 33 and modulation means comprising a polarizer 34, a light modulator 35, and an analyzer 36.

The polarizer 34 is adapted to polarize the light from the laser 32 in a first plane. The analyzer 36 is adapted to polarize light in a second plane (which may but need not be coincident with the first plane) or, in the particular application illustrated, to transmit selectively the light transmitted by the polarizer 34. The light modulator 35 changes the orientation of the plane of polarization of the light transmitted by the polarizer 34 as a function of a modulating signal such as a video signal applied to the light modulator 35 from a video amplifier 37.

Ideally, the video amplifier 37 produces an output within the limits of the operating points 30 and 31 shown in FIG. 1. Thus, for a signal representative of black (e.g., a blanking signal) the signal impressed upon the light modulator 35, which depends on the clamp bias set by means indicated at 38, is such that the light modulator 35 rotates the plane of polarization of light transmitted by the polarizer 34 so that the light incident upon the analyzer 36 is polarized in a plane normal to the plane of polarization of the analyzer 36. This is the condition for maximum extinction ratio.

The light transmitted by the analyzer 36 includes a reference component related to the output of a generator 50, as noted below, and impinges on a half-silvered mirror 39 which partially transmits and partially reflects the light.

The transmitted light passes through recording optics 40 and impinges on recording apparatus 42; the reflected light impinges on monitor means such as a photomultiplier tube 44. The photomultiplier 44 produces an output current corresponding to the intensity of the light transmitted by the analyzer 36. The output of the photomultiplier 44 is gated by a gate 46 in accordance with the video signal blanking pulses. The output of the gate 46 is thus a series of pulses occuring at blanking intervals. This output is compared in a phase detector 48 with a reference signal generated by a reference signal generator 50.

The reference signal generator 50 generates a reference signal having a frequency equal to one-half the horizontal line drive frequency of the video signal. The signal is a square wave of small amplitude. The two inputs to the phase detector 48 are compared, as pointed out in greater detail hereinafter, to produce an output signal in the nature of an error signal having polarity and magnitude. For control purposes, the error signal is amplified in an amplifier 52 the output of which controls a motor 54 to rotate the analyzer 36 in such a way as to maintain operation at the desired operating point for black bias indicated by the line 30 in FIG. 1. The motor 54 may as well be used to rotate the polarizer 34 or light modulator 35. Alternatively, the output of the phase detector 48 may be employed to regulate the clamp bias.

The output of the reference pulse generator 50, in addition to being supplied as one input to the phase detector 48, is gated at blanking intervals by a gate 56. The output of the gate 56 is inverted by an inverter 58 and supplied to the video amplifier 37 to modify the video signal in a manner pointed out below.

FIGS. 3—18 show the operation of the apparatus of FIG. 2.

The output of the reference pulse generator 50 is shown in FIG. 3. This is a square wave signal 60 of small amplitude and having a frequency equal to one-half the horizontal line drive frequency of the video signal.

The blanking signal 61 used as a gating signal for the gates 46 and 56 is shown in FIG. 4. The pulses of the blanking signal 61 have a frequency of recurrence twice as great as the frequency of the signal 60 produced by the reference signal generator 50. The onset of alternate blanking pulses 62 coincides with the rise of the amplitude of the square wave 60 to its maximum value. The onset of the remaining alternate blanking pulses 63 in the signal 61 coincides with the decrease of the amplitude of the waveform 60 to its minimum value.

As noted above, the gate 56 gates the signal 60 at blanking intervals 62 and 63. The output of the gate 56 is shown in FIG. 5. It consists of a waveform 64 having positive square wave pulses 66 alternating with negative square wave pulses 68. The pulses 66 and 68 are the portions of the waveform 60 coincident in time with the blanking intervals of the waveform 61.

The output of the gate 56 is inverted in the inverter 58, and the waveform 70 produced by the inverter 58 is shown in FIG. 6. The waveform 70 corresponds to the signal 64 except that the pulses coincident in time with the positive pulses 66 are negative pulses 72, while the pulses coincident in time with negative pulses 68 are positive pulses 74.

As noted above, the output of the inverter 58 is applied to the video amplifier 37. A conventional video signal is indicated in FIG. 7 by a waveform 76. This waveform consists of picture information 78 alternating with blanking pulses 80. A problem with conventional apparatus is that the blanking level 80 does not continually produce maximum extinction ration.

FIG. 8 shows a video signal 82 modified in accordance with the present invention. This video signal includes components 84 conveying picture information alternating with blanking components. The output pulses from the inverter 58 identified at 72 in FIG. 6 are combined with the normal blanking 80 shown in FIG. 7 to produce blanking signals 86 having depressed voltage levels. The output pulses 74 from the inverter 58 shown in FIG. 6 are combined with the blanking signals 80 shown in FIG. 7 to produce blanking levels 88 having elevated voltages.

The difference in voltage between the blanking signals 86 on the one hand and the blanking signals 88 on the other is slight, because the square wave 60 shown in FIG. 3 is of small amplitude. Nevertheless, these blanking signals 86 and 88 alternately displace the operating point 30 of the light modulator 35 to the left and to the right (FIG. 1).

When the apparatus is properly adjusted, the modulation means comprising the polarizer 34, light modulator 35, and analyzer 36 is controlled so that a reference component of the output of the modulation means conforms to a predetermined standard. In this case, the displacement of the operating point 30 equal distances to the left and to the right results in an output of the gate 46 as shown in FIG. 9. For a given displacement to the left, pulses 92 of the waveform 90 are produced, and, for a displacement to the right of equal magnitude, pulses 94 are produced. The pulses 92 and 94 have the same amplitude. Thus, at a frequency equal to half the horizontal line drive frequency of the video signal, there is no variation in the waveform 90. This straight-line output, which is smoothed by a capacitor 95 and is the equivalent of the waveform 90, is shown at 96 in FIG. 10.

Consideration of FIG. 1 explains why the pulses 92 equal the pulses 94 in height. Displacement to the left and right as shown in FIG. 1 in the case of proper adjustment shifts the operating point alternately between lines 98 and 99. Inasmuch as the waveform 21, being sinusoidal, is symmetrical about the line 30, the displacement in opposite directions through equal bias voltages results in equal light transmission, indicated by a line 99′.

FIGS. 11 and 12 show the operation of the gate 46 for excessive black bias. In this case, all black level signals are translated to the right, so that the alternate displacement to the left and to the right effected by the blanking signals 86 and 88 (FIG. 8) produces operation between limits 100 and 102. The light level 104 corresponding to the bias 100 is less than the light level 106 corresponding to the bias 102. Thus, the waveform 108 that is produced by the gate 46 includes pulses 110 of reduced amplitude (as compared to the amplitude of the pulses 92) and corresponding to the light level 104 alternating with pulses 112 of increased amplitude (as compared to the amplitude of the pulses 94) and corresponding to the light level 106.

Unlike the waveform 90 shown in FIG. 9, the waveform 108 does show periodic variation at a frequency equal to half the horizontal line drive frequency. A corresponding smooth curve 114, resulting from the capacitor 95, is shown in FIG. 13.

FIG. 14 shows a translation of the operating point from the desired point 30 to the left (insufficient black bias). In this case, the alternating blanking levels 86 and 88 (FIG. 8) result in operating points 118 and 120. The light levels corresponding to these operating points are, respectively, 122 and 124.

Thus, as FIG. 15 shows, the output of the gate 46 for insufficient black bias comprises pulses 126 of amplitude increased as compared to the pulses 92 (FIG. 9) and corresponding to the light level 122 alternating with pulses 128 of amplitude decreased as compared to the pulses 94 and corresponding to the light level 124.

The waveform 130 of FIG. 15 also displays a periodicity at a frequency equal to half the horizontal line drive frequency of the video signal, and a corresponding waveform 132 is illustrated in FIG. 16.

The phase detector 48 is adapted to make a phase comparison between the waveform 90, 108, or 130, whichever the case may be (or the corresponding waveform 96, 114, or 132) and the waveform 60 shown in FIG. 3 (or a corresponding waveform 134 shown in FIG. 17).

In other words, one of the inputs to the phase detector 48 is the waveform 60 or 134 and is a constant input. The other input to the phase detector 48 is the waveform 90 or 96 if the apparatus is properly adjusted. If the apparatus is not properly adjusted, the other input is the waveform 108 or 114 or the waveform 130 or 132. Conventional phase detectors are available for comparing two signals of the same frequency but differing in phase. The phase detector 48 thus produces an output signal in the nature of an error signal having one polarity or the other for controlling the reversible motor 54 to turn the analyzer 36 clockwise or counterclockwise as may be necessary to restore the apparatus to the desired operating point 30.

FIG. 18 shows a video correction signal 134 which may be used if needed. The video correction signal includes portions 136 of reference voltage occurring at blanking intervals and portions 138 of negative voltage alternating with portions 140 of positive voltage. The waveform 134 thus corresponds to the portion of the waveform 60 (FIG. 3) not coincident in time with the blanking pulses but is 180° out of phase therewith. The waveform 134 is adapted to cancel out the portion of the waveform 60 that may appear in so much of the video signal as is not coincident in time with the blanking intervals. The waveform 60 may appear in the video signal because of the connection through a capacitor 142 and clamp 144.

FIG. 19 shows a second embodiment of the invention adapted to optimize the video amplifier gain. A white pulse generator 150 receives an input from a reference signal generator 50′ similar to the reference signal generator 50 shown in FIG. 2 and adapted to generate a reference signal having a frequency equal to one-half the horizontal line drive frequency. The white pulse generator 150 generates a waveform 152 shown in FIG. 20 which includes large peaks 154 alternating with smaller peaks 156, the complete generating cycle having a frequency equal to one-half the horizontal line drive frequency. The peaks 154 and 156 occur during blanking intervals, as a comparison of FIGS. 20 and 4 reveals. The peaks 154 and 156 are, respectively, 10 percent greater and 10 percent smaller in amplitude than a signal indicative of white.

The conventional video signal shown in FIG. 7 is modified in the way shown by a waveform 157 in FIG. 21 by adding the output of the white pulse generator 150 to the input to the video gain control 158 at a point 160. The waveform 157 includes pulses 164 of relatively large amplitude corresponding to the pulses 154 and occurring during blanking intervals alternating with pulses 166 of smaller amplitude corresponding to the pulses 156 and also occurring during blanking intervals.

When the video amplifier gain is properly adjusted, the voltages represented by the pulses 164 and 166 are displaced equally in opposite directions from the desired operating point 31 shown in FIG. 22. The pulse 164, being of greater amplitude, results in a higher voltage applied to the light modulator 35′, operation being at a point 164′. The pulse 166, being of smaller amplitude, results in operation below the operating point 31, and the voltage on the light modulator 35′ produces operation at a point 166′. Operation at the point 164′ and at the point 166′ results in each case in the same light output 168.

The output of the photomultiplier tube 44′ supplies an input to a gate 168 which is gated by pulses from the white pulse generator 150 to produce an output of waveform 170 shown in FIG. 23. The waveform 170 includes pulses 172 alternating with pulses 174. All of the pulses 172 and 174 are of the same height for correct video amplifier gain, the pulses 172 corresponding to the pulses 164 (FIG. 21) and the pulses 174 corresponding to the pulses 166.

A pulse shaper 176 shapes the waveform 170 with the pulses 172 and 174 to produce a flat waveform 178 (FIG. 24). This results because there is no periodicity at a frequency equal to half the frequency of the horizontal line drive.

If the video amplifier gain is excessive, a waveform 170′, shown in FIG. 25, results. The waveform 170′ includes pulses 172′ alternating with pulses 174′. The pulses 172′ correspond to the pulses 164 (FIG. 21), and the pulses 174′ correspond to the pulses 166.

FIG. 26 shows why the pulses 172′ are of reduced amplitude. Because of the excessive video amplifier gain, the operating point 173 is translated considerably to the right from the operating point 31. There results a light output 180 which is less than the light output 182 resulting from operation at the point 175, which corresponds to the pulse 166 in FIG. 21 and is closer to the operating point 31.

FIG. 27 shows modification of the waveform 170′ to produce a waveform 184. This waveform is produced by the pulse shaper 176 in the case where the output of the gate 168 indicates excessive video amplifier gain. The waveform 184 is a square wave signal of small amplitude including negative portions 186 alternating with positive portions 188. The negative portions 186 correspond to the short peaks 172′ (FIG. 25) and the positive portions 188 correspond to the tall peaks 174′

If the video amplifier gain is insufficient, a waveform 170″, shown in FIG. 28, results. The waveform 170″ includes pulses 172″ alternating with pulses 174″. The pulses 172″ correspond to the pulses 164 (FIG. 21), and the pulses 174″ correspond to the pulses 166.

FIG. 29 shows why the pulses 172″ are of increased amplitude. Because of the insufficient video amplifier gain, the operating point 173′ is translated from the operating point 31 a lesser distance than is the operating point 175′. There results a light output 190 corresponding to the operating point 173′ which is greater than the light output 192 corresponding to the operating point 175′.

The pulse shaper 176 in this case produces a square wave of small amplitude 198 (FIG. 30) which is 180° out of phase with the waveform 184 (FIG. 27). Specifically, there are positive portions 200 alternating with negative portions 202. The positive portions 200 correspond to the pulses 164, and the negative portions 202 correspond to the pulses 166.

A phase detector 48 compares the signal from the reference pulse generator 50′ with the signal from the pulse shaper 176 and produces an output indicating zero error or error of one polarity or the other, depending on whether the input to the detector 48′ from the pulse shaper 176 is the waveform 178 (FIG. 24), 184 (FIG. 27), or 198 (FIG. 30). The output from the phase detector 48′ is supplied for control purposes to the video gain control 158 to control the video amplifier gain to maintain it at a proper level: namely, a level such that the output of the gate 168 is the waveform 178 shown in FIG. 24.

Thus, there is provided in accordance with the invention novel and highly effective modulation apparatus facilitating, notably, laser color kinescope recording. The apparatus automatically maintains maximum extinction ratio and optimum video amplifier gain.

Many modifications of the representative embodiments of the invention disclosed herein will readily occur to those skilled in the art. For example, both disclosed embodiments of the invention may be used simultaneously. Also, the invention is applicable not only to positive modulation television systems but also to negative modulation television systems, as well as to the recording of signals in other regions of the electromagnetic spectrum including notably the radar and infrared. Further, although a laser has been illustrated as a means for producing a beam of coherent electromagnetic radiation, other means may also be used. In addition, the particular waveforms disclosed herein, and the particular means for generating them, are illustrative only; the use of any waveforms adaptable for phase comparison in accordance with the invention is contemplated, irrespective of the particular manner in which they are generated. Moreover, the principles of the invention are not restricted to the case where the error of the operating point is detected on a line-to-line basis; in the case of a video signal, such detection can be effected entirely during one blanking period, for example, the synchronizing pulse providing the offset and the phase error sampling being done on the sync tip and back porch. Accordingly, the invention is to be construed as including all of the embodiments thereof within the scope of the appended claims.

I claim:

1. In apparatus for recording a signal including periodic blanking pulses at a predetermined recurrence frequency, the combination comprising, means for producing a beam of coherent electromagnetic radiation, reference signal means for producing a reference signal having a frequency bearing a predetermined relationship to the rate of occurrence of the blanking pulses in said signal to be recorded, modulation means operative in response to said signal to be recorded and to said reference signal to modulate said beam of coherent electromagnetic radiation to produce a modulated output including a recurring reference component related to said reference signal, monitor means for monitoring said reference component and producing a monitor output corresponding thereto, phase detector means operative to compare the phase between said monitor output and said reference signal and to produce a control signal, and control means operative in response to said control signal to control said modulation means to cause said reference component to conform to a predetermined standard.

2. Apparatus as set forth in claim 1 in which said means for producing a beam of coherent electromagnetic radiation comprises a laser.

3. Apparatus as set forth in claim 1 in which said modulation means comprises polarizing means for polarizing said radiation in a first plane, analyzing means for transmitting radiation polarized in a second plane, and means operative in response to application of said signal to be recorded to adjust the orientation of the plane of polarization of radiation passing from said polarizing means to said analyzing means in accordance with said signal.

4. In recording apparatus, a laser for producing a beam of coherent light, polarizing means for polarizing said light in a first plane, analyzing means for transmitting radiation polarized in a second plane, a light modulator for adjusting the orientation of the plane of polarization of light en route from said polarizing means to said analyzing means, means for impressing a signal to be recorded including a blanking portion and having a horizontal line drive on said light modulator to control the action thereof, clamp means for applying a black signal to said light modulator during blanking, means for producing a square wave signal of small amplitude and having a frequency equal to half the horizontal line drive frequency of the signal to be recorded, means for gating the square wave signal at the horizontal line drive frequency to produce a gated signal and for modifying said signal to be recorded as a function of said gated signal, a photomultiplier for monitoring the light transmitted by said analyzer and producing an output proportionate thereto, means for gating said output synchronously with the gating of said square wave signal, a phase detector for making a phase comparison between the gated output of said photomultiplier and said square wave signal, and means responsive to the output of said phase detector for adjusting at least one of said light modulator and polarizing, analyzing, and clamp means to maintain maximum extinction ratio.

5. In recording apparatus, a laser for producing a beam of coherent light, polarizing means for polarizing said light in a first plane, analyzing means for transmitting radiation polarized in a second plane, a light modulator for adjusting the orientation of the plane of polarization of light en route from said polarizing means to said analyzing means, means for impressing a signal including a blanking signal on said light modulator to control the action thereof, means for alternately increasing and decreasing the blanking signal level, means for monitoring light intensity transmitted by said analyzing means during blanking, and means responsive to said light intensity for adjusting at least one of said light modulator and polarizing and analyzing means so that the plane of polarization of light incident upon said analyzing means during a given blanking interval is offset by a given angle from a plane normal to said second plane and the plane of polarization of light incident upon said analyzing means during the next succeeding blanking interval is offset an equal but opposite angle from said normal plane.

6. In recording apparatus, a laser for producing a beam of coherent light, polarizing means for polarizing said light in a first plane, analyzing means for transmitting radiation polarized in a second plane, a light modulator for adjusting the orientation of the plane of polarization of light en route from said polarizing means to said analyzing means, means for impressing a signal to be recorded including white reference pulses on said light modulator to control the action thereof, successive ones of said white reference pulses being alternately of higher and lower amplitude, means for monitoring the intensity of light transmitted by said analyzing means during said white reference pulse intervals and producing a monitor output signal proportionate thereto, means for generating a reference signal having a frequency equal to half the frequency of recurrence of said white reference pulses, means for making a phase comparison between said monitor output signal and said reference signal, and means response to the output of said phase detector for adjusting the gain of said signal to be recorded so that successive white reference pulses cause said light modulator to offset the plane of polarization of light incident upon said analyzing means through equal and opposite angles with respect to the polarizing plane of said analyzing means.

7. In apparatus for recording a video signal including periodic blanking pulses and having a predetermined horizontal line drive frequency, the combination comprising:

means for producing a beam of coherent electromagnetic radiation;

polarizing means for polarizing said radiation in a first plane;

analyzing means for transmitting radiation polarized in a second plane;

a modulator interposed between said polarizing means and said analyzing means and operative to vary the orientation of the plane of polarization of radiation passing from said polarizing means to said analyzing means in response to application of an electrical signal;

means for applying said video signal to said modulator;

means for alternately increasing and decreasing the level of the blanking pulses of said video signal;

means for measuring the intensity of the radiation transmitted by said analyzing means during blanking; and means operative in response to said measured intensity for adjusting at least one of said modulator and polarizing and analyzing means to cause the plane of polarization of radiation incident on said analyzing means during a given blanking interval to be offset by a given angle from a plane normal to said second plane and the plane of polarization of radiation incident on said analyzing means during the next succeeding blanking interval to be offset by an equal but opposite angle from said normal plane.

8. Apparatus as set forth in claim 7 wherein said radiation producing means comprises a laser.

9. Apparatus as set forth in claim 8 wherein said modulator is a light modulator and further includes means for clamping the video signal applied to said modulator at a predetermined bias level to maintain maximum extinction ratio.

10. Apparatus as set forth in claim 9 wherein said means for alternately increasing and decreasing the level of the blanking pulses of said video signal comprises means for generating a square wave reference signal having a frequency equal to one-half said line drive frequency, and means for combining said square wave reference signal with said video signal prior to application to said modulator.

PO-1050
(5/69)

UNITED STATES PATENT OFFICE
CERTIFICATE OF CORRECTION

Patent No. 3,562,422 Dated February 9, 1971

Inventor(s) Renville H. McMann, Jr.

It is certified that error appears in the above-identified patent and that said Letters Patent are hereby corrected as shown below:

First page of patent, the Assignee, "Columbia Broadcasting Systems, Inc." should read -- Columbia Broadcasting System, Inc. --. Column 1, line 22, "block" should be -- black --. Column 4, line 72, "ration" should be -- ratio --. Column 7, line 38, "48" should be -- 48' --. Column 9, line 23, "response" should be -- responsive --.

Signed and sealed this 19th day of October 1971.

(SEAL)
Attest:

EDWARD M.FLETCHER,JR.
Attesting Officer

ROBERT GOTTSCHALK
Acting Commissioner of Pate